United States Patent [19]

Hayashi

[11] Patent Number: 6,028,306
[45] Date of Patent: Feb. 22, 2000

[54] SCANNING MICROSCOPE

[75] Inventor: Shinichi Hayashi, Toshima-ku, Japan

[73] Assignee: Olympus Optical Co., Ltd., Tokyo, Japan

[21] Appl. No.: 09/078,539

[22] Filed: May 13, 1998

[30] Foreign Application Priority Data

May 14, 1997 [JP] Japan ..................................... 9-123946

[51] Int. Cl.$^7$ .............................. H01J 3/14; G02B 21/06
[52] U.S. Cl. ........................... 250/235; 359/368; 359/385
[58] Field of Search ................................. 250/201.3, 234, 250/235; 359/368, 385

[56] References Cited

U.S. PATENT DOCUMENTS 5,022,743  6/1991  Kino et al. .
5,428,475  6/1995  Tanaami et al. .

FOREIGN PATENT DOCUMENTS

4414940A1  11/1995  Germany .
8211296A   8/1996   Japan .

OTHER PUBLICATIONS

Corle, et al., "Confocal Scanning Optical Microscopy and Related Imaging Systems", Academic Press, 1996, pp. 67–105.

McCabe, et al., "Direct–view microscopy: ptical sectioning strength for finite–sized, multiple–pinhole arrays", Journal of Microscopy, vol. 184, Pt 2, Nov. 1996, pp. 95–102.

*Primary Examiner*—Edward P. Westin
*Assistant Examiner*—Glenn Kinnear
*Attorney, Agent, or Firm*—Pillsbury Madison & Sutro LLP

[57] ABSTRACT

A scanning microscope includes a multiple point source producing device for producing a plurality of point sources arranged in an orderly array or focal points equivalent thereto; a scanning device for scanning in small regions into which the point sources or the focal points are divided; a plurality of minute apertures located at positions conjugate with the point sources or the focal points; a light-receiving device composed of a plurality of light-receiving elements for independently receiving light transmitted through the minute apertures; and a specimen image producing device for forming an image of a specimen in accordance with the amount of deflection caused by the scanning device and a signal received by the light-receiving device. In this way, the scanning microscope in which illumination efficiency is good and a real-time observation can be made is provide.

23 Claims, 12 Drawing Sheets

SCANNING MICROSCOPE

BACKGROUND OF THE INVENTION

1. Field of the Invention

This invention relates to a scanning microscope for performing a confocal scanning operation.

2. Description of Related Art

For microscopes of this type, as discussed by, for example, T. R. Corle and G. S. Kino, "Confocal Scanning Optical Microscopy and Related Imaging Systems", Academic Press (1966), various microscopes have been proposed and manufactured. In view of types of confocal scanning devices used in such microscopes, the microscopes are roughly divided into two types, those in which a single-beam scanning device is used and those in which a multi-beam scanning device is used. The fundamental constructions of these two types of microscopes will be explained below.

In the beginning, a description is given of the fundamental construction of a confocal microscope using the single-beam scanning device (which is hereinafter referred to as a single-beam scanning microscope) with reference to FIG. 1. A light beam emitted from a light source 1 is brought to a focus by means of a condenser lens 2, and an image of light transmitted through a first minute aperture 3 placed at this focus position is formed, through a first relay lens 4 and an objective lens 5, on a specimen 6. The light beam reflected by the specimen 6 is deflected in a direction different from that of the first minute aperture 3 by a beam splitter 7 interposed between the objective lens 5 and the first relay lens 4. This deflected beam is condensed, by a second relay lens 8, at a second minute aperture 9 located at a position conjugate with the first minute aperture 3 so that the intensity of light transmitted through this aperture is detected by a detector 10 such as a photomultiplier.

A scanning device 11 is disposed between the objective lens 5 and the beam splitter 7. The scanning device 11 has, for example, a galvanomirror or polygonal mirror to scan the image of the first minute aperture 3 on the surface of the specimen 6. A controller 12 connected to the scanning device 11 and the detector 10 is adapted to detect the position of image formation of the first minute aperture 3 on the specimen 6 in accordance with the amount of deflection of the light beam caused by the scanning device 11, and to obtain a specimen image in a wide region in accordance with a detection signal thereof and an output signal from the detector 10 relative to the position of image formation. In this way, the specimen image is displayed on an image output device 13 such as a TV monitor. Also, where a single-mode oscillation laser is used as the light source, the first minute aperture 3 is often removed.

Subsequently, as disclosed in U.S. Pat. No. 5,022,743, the fundamental construction of the confocal microscope in the case where a Nipkow disk is used as an example of the multibeam scanning device is explained with reference to FIG. 2. A light beam emitted from a light source 21 is radiated on a Nipkow disk 23 by a condenser lens 22. A plurality of beams which are split by passing through a plurality of small apertures provided in the Nipkow disk 23 are focused on the specimen 6 through a relay lens 24 and the objective lens 5. The light beams reflected from the specimen 6 are focused again on the small apertures of the Nipkow disk 23 through the objective lens 5 and the relay lens 24.

By a beam splitter 25 interposed between the Nipkow disk 23 and the condenser lens 22, light transmitted through the Nipkow disk 23 is deflected in a direction different from that of the light source 21, and is focused through a photographic lens 26 on an image sensor 27. Consequently, an image proportional to the reflectance of the specimen 6 is formed on the image sensor 27 and displayed on the image output device 13. The plurality of small apertures provided in the Nipkow disk 23 are spaced at prescribed intervals, and thus illumination light striking the specimen 6 at a time provides multiple spot illumination. However, since the Nipkow disk 23 is rotated at high speed by a motor 28, the entire surface of the specimen can be scanned in less time and a confocal observation with the naked eye is possible.

In this way, as seen from a difference in fundamental construction between both microscopes, the single-beam scanning microscope is high in illumination efficiency of the light source, but requires much time to scan the entire field of the microscope. Thus, it is impossible to make real-time observation at a video rate. In contrast to this, a confocal microscope using the multibeam scanning device (which is hereinafter referred to as a multibeam scanning microscope), not to speak of the microscope using the Nipkow disk, materially reduces the scanning time and thus is capable of making real-time observation at the video rate, which is very convenient. The present invention is directed to the confocal microscope using the multibeam scanning device, and prior art examples corresponding thereto are set forth in U.S. Pat. No. 5,022,743 mentioned above, U.S. Pat. No. 5,428,475, and Japanese Patent Preliminary Publication No. Hei 8-211296.

However, the multibeam scanning microscope which is suitable for such real-time observation has various problems. One of these problems refers to illumination efficiency. Specifically, when the Nipkow disk is used as the scanning device, as mentioned above, most of the light emitted from the light source is blocked by a portion, devoid of the small apertures, of the surface of the Nipkow disk, and hence illumination efficiency is so considerably impaired that fluorescence observation is not virtually made. Thus, some techniques for obviating this defect are proposed, and one of them is disclosed in U.S. Pat. No. 5,428,475 mentioned above.

According to this technique, a laser is used as a light source, and a light-collecting means such as a Fresnel lens array is provided between a condenser lens and a beam splitter. By doing so, light from the laser is split so that the light is collected at respective positions of the apertures of the Nipkow disk, and the light-collecting means is rotated together with the Nipkow disk by a motor. With this technique, the illumination efficiency is considerably improved and the fluorescence observation becomes possible, but there is the problem that it is very difficult to constitute the light-collecting means integrated with the Nipkow disk.

In the multibeam scanning microscope of the prior art, including the use of the Nipkow disk, locations on the specimen correspond individually to light-receiving elements. Thus, in order to obtain the specimen image while holding a resolving power governed by the optical system of the microscope, an image sensor with a high integration density of pixels, such as a CCD, has often been used as a light-receiving means. The image sensor, however, is such that as the integration density becomes high, a light-receiving area per unit pixel reduces, with a resulting decrease in sensitivity. Hence, the multibeam scanning microscope, in contrast with the single-beam scanning microscope, has the problem that detection with high sensitivity cannot be obtained. Furthermore, since the power consumption of the image sensor is proportional to the number of light-receiving elements, there is the problem that as the integration density of the image sensor becomes high, its power consumption increases. Consequently, it is considered that a high-sensitivity image pickup tube whose power consumption is small is used instead of the image sensor, but in this case, the problem arises that the image pickup tube is inferior in resolving power to the image sensor.

For multibeam scanning microscopes in which Nipkow disks are not used, many proposals are made. For example, Hei 8-211296 described above discloses a microscope designed so that a light source means including a matrix of a plurality of point sources and a detection means placed at a position conjugate with the point sources are used, and these point sources are periodically turned on and off to thereby scan a specimen and eliminate mechanical moving parts. However, even with this prior art example, since most of light emitted from the light source means is blocked and only a scanning spot part is used as illumination light, illumination efficiency is remarkably impaired. For the light-receiving means, like the above case, the image sensor with a high integration density of pixels must be used and a light-receiving sensitivity cannot be improved. Moreover, there is the problem that it is difficult to align a high integration density of point sources with the detection means.

SUMMARY OF THE INVENTION

It is, therefore, a primary object of the present invention to provide a scanning microscope in which a real-time observation can be made with efficient illumination.

It is another object of the present invention to provide a scanning microscope in which high-sensitivity light-receiving elements can be used and, for example, as in the observation of a fluorescent image, a very dark specimen image can be observed.

It is still another object of the present invention to provide a scanning microscope in which, without impairing a high resolving power of a confocal microscope and with a wide field held, the total number of light-receiving elements is reduced, power consumption is made small, and cost is lowered.

In order to achieve these objects, according to one aspect of the present invention, the scanning microscope includes a multiple point source producing means for producing a plurality of point sources arranged in an orderly array or focal points equivalent thereto; a scanning means for scanning in small regions into which the plurality of point sources or the equivalent focal points are divided; a plurality of minute apertures, on the detection side, located at positions conjugate with the plurality of point sources or the equivalent focal points; a light-receiving means composed of a plurality of light-receiving elements for independently receiving light transmitted through the plurality of minute apertures; and a specimen image producing means for forming the image of a specimen in accordance with the amount of deflection caused by the scanning means and a signal received by the light-receiving means.

According to another aspect of the present invention, the scanning microscope includes a multiple line source producing means for producing a plurality of line sources arranged in an orderly array or linear focal points equivalent thereto; a scanning means for scanning in small regions surrounded by the line sources adjacent to one another or the equivalent linear focal points; linear apertures, on the detection side, located at positions conjugate with the plurality of line sources or the equivalent linear focal points; a light-receiving means composed of a plurality of light-receiving elements located at positions conjugate with the linear apertures; and a specimen image producing means for forming the image of a specimen in accordance with the amount of deflection caused by the scanning means and a signal received by the light-receiving means.

According to still another aspect of the present invention, the scanning microscope includes a light source means consisting of an ultrashort pulse laser; a beam splitting means for splitting a light beam from the light source means into a plurality of beams; a multiple focal point producing means for producing a plurality of focal points arranged in an orderly array, from the plurality of beams split by the beam splitting means; a scanning means for scanning in small regions into which the plurality of focal points are divided; a light-receiving means composed of a plurality of light-receiving elements located at positions nearly conjugate with the plurality of focal points; and a specimen image producing means for producing a fluorescent image of a specimen in accordance with the amount of deflection caused by the scanning means and a signal received by the light-receiving means.

According to a further aspect of the present invention, the scanning microscope includes a light source means consisting of an ultrashort pulse laser; a beam splitting means for splitting a light beam from the light source means into a plurality of beams; a multiple linear focal point producing means for producing a plurality of linear focal points arranged in an orderly array, from the plurality of beams split by the beam splitting means; a scanning means for scanning in small regions surrounded by the linear focal points adjacent to one another; a light-receiving means composed of a plurality of light-receiving elements located at positions nearly conjugate with the plurality of linear focal points; and a specimen image producing means for forming a fluorescent image of a specimen in accordance with the amount of deflection caused by the scanning means and a signal received by the light-receiving means.

These and other objects as well as the features and advantages of the present invention will become apparent from the following detailed description of the preferred embodiments when taken in conjunction with the accompanying drawings.

DETAILED DESCRIPTION OF THE PREFERRED EMBODIMENTS

Figure 1:
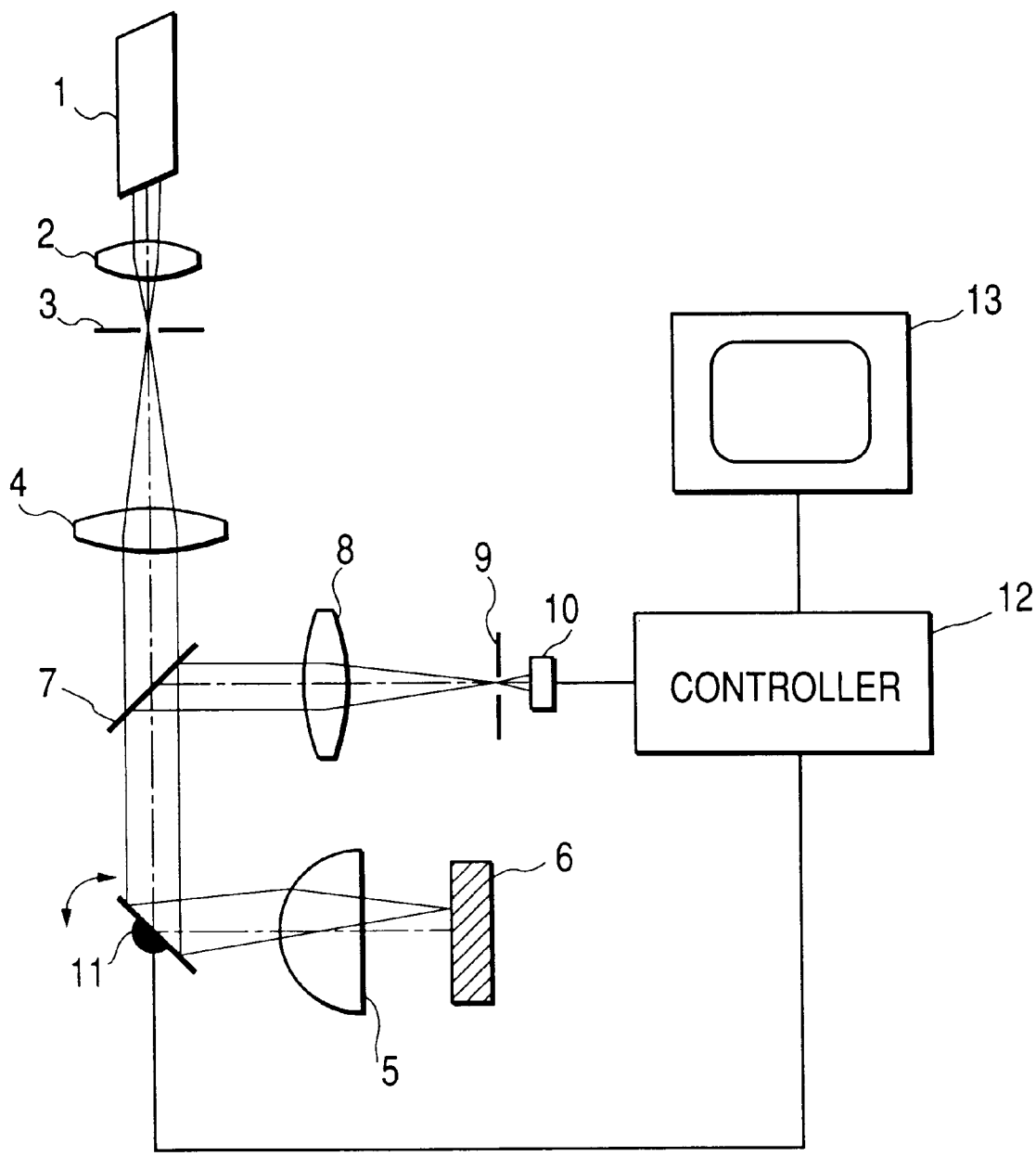
FIG. 1 is a view showing the fundamental construction of a prior art example of a scanning microscope.
Figure 2:
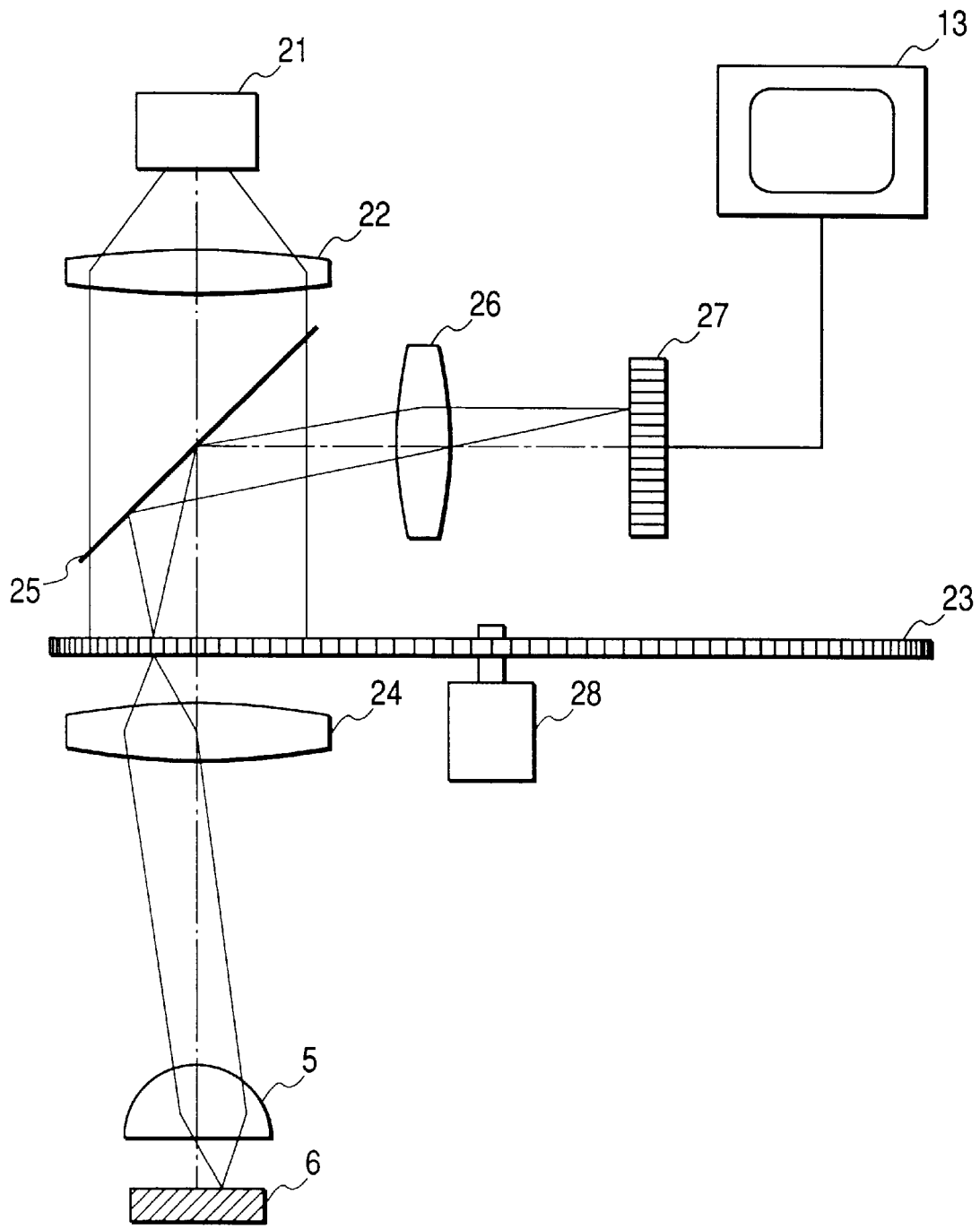
FIG. 2 is a view showing the fundamental construction of another prior art example.

Before undertaking the explanation of the embodiments, it will be expedient to describe the fundamental construction and function of the present invention.

The microscope of the present invention, as already stated, includes a multiple point source producing means for producing a plurality of point sources arranged in an orderly array or focal points equivalent thereto; a scanning means for scanning in small regions into which the plurality of point sources or the equivalent focal points are divided; a plurality of minute apertures, on the detection side, located at positions conjugate with the plurality of point sources or the equivalent focal points; a light-receiving means composed of a plurality of light-receiving elements for independently receiving light transmitted through the plurality of minute apertures; and a specimen image producing means for forming the image of a specimen in accordance with the amount of deflection caused by the scanning means and a signal received by the light-receiving means.

According to the present invention, the microscope is designed so that the plurality of point sources, or the equivalent focal points, produced by the multiple point source producing means are projected on the specimen. Thus, a blocking rate of light from the light sources is low and efficient illumination can be obtained. As will be well known, the scanning time required for illuminating the entire field of the specimen is proportional to the area of a region to be scanned. According to the present invention, it is only necessary to scan within each of small regions into which the plurality of point sources, or the equivalent focal points, projected on the specimen are divided. In this way, the microscope of the present invention, in contrast with the conventional single-beam scanning microscope, is capable of producing the image with high speed, so that the specimen image can be observed in real time.

Furthermore, in the present invention, unlike the microscope using the Nipkow disk mentioned above, it is merely necessary that the light-receiving elements are arranged so as to correspond individually to the point sources or the equivalent focal points. Consequently, the total number of light-receiving elements is considerably small and spaces between the elements can be increased. Thus, a photomultiplier which is high in sensitivity and large in element size can be adopted as the light-receiving means, and the detection of the fluorescent image with high sensitivity becomes possible. Moreover, since the total number of light-receiving elements can be equalized with the number of the point sources or the equivalent focal points and mutual spaces between the light-receiving elements can be widened, the point sources or the equivalent focal points are easily aligned with the light-receiving elements.

The specimen image producing means in the present invention includes an image forming means and an image memory, so that addresses representing the locations on the specimen calculated from position coordinates on the surfaces of the light-receiving elements and the amount of deflection caused by the scanning means are preset in the image memory, and values corresponding to signals from the light-receiving elements are written in these addresses by the image forming means to form the specimen image. By doing so, when a single scanning operation is completed, the image of the entire field of the specimen will be forged in the memory, and when the image is displayed on an image display, the specimen image can be observed.

The present invention is convenient when it is designed so that the point sources or the focal points are arranged at intersections formed by two sets of equally spaced parallel lines mutually making a predetermined angle, and the scanning means scans small regions of parallelograms into which the focal points are divided. In particular, if each of the small regions is shaped into a rectangular or square form, the design of the scanning means will be facilitated. Such a favorable condition is obtained even when the point sources or the focal points are arranged at equal intervals along equally spaced parallel lines making a minute angle with a scanning direction of the scanning means. In this case, it is only necessary that the scanning means is made to scan in only one direction, and the design of the scanning means can be made simpler compared with the case where a two-dimensional region is scanned. Furthermore, in this case, if scanning paths in adjacent regions are made to come in contact with each other or partly to overlap, the entire specimen image with even illumination can be formed by a scan in one direction.

As the multiple point source producing means in the present invention, a diode laser matrix can be used. The diode laser matrix is made up from semiconductor lasers arranged in a plane and may be thought of as an assembly of point sources arranged in an orderly array.

It is favorable for the scanning means in the present invention to use a galvanomirror, a polygonal mirror, or an acoustooptical element. In any case, the scanning means is simple in structure and the scanning operation with high speed and stability can be performed.

It is favorable for the light-receiving means in the present invention to use an image sensor, a photomultiplier, or a photon counter. The image sensor, because of an orderly array of its light-receiving elements, is easy to arrange the light-receiving elements at positions conjugate with the point sources. In the case where the photomultiplier arranged in a like figure with the minute apertures mentioned above is used, the detection of the specimen image with high sensitivity becomes possible, compared with the case of an ordinary image sensor, and the detection of the fluorescent image also becomes possible. With the use of the photon counter arranged in a like figure with the minute apertures, the detection of the specimen image which is higher in sensitivity than the case of the photomultiplier becomes possible, and the detection of a faint fluorescent image also becomes possible.

Furthermore, even when the multiple point source producing means is designed to include a light source means for producing one point source or a plurality of point sources or light equivalent thereto; a beam splitting means for splitting a light beam from the light source means into a plurality of beams; and a multiple focal point producing means for producing a plurality of focal points from the beams split by the beam splitting means, it is possible to produce a plurality of focal points equivalent to the plurality of point sources.

In this case, if a laser is used as the light source means, point sources with high luminance will be obtained. It is possible to combine the beam splitting means with the multiple focal point producing means by using a plurality of optical fiber elements. When light from the light source means is rendered incident on the entrance end of an optical fiber, the exit end thereof can be regarded as the point sources. If a microlens array is used to combine the beam splitting means with the multiple focal point producing means, the design of the microscope will be simplified. However, with the use of the microlens array alone, the focal points equivalent to the point sources may not be produced. In this case, the microlens array is used as only the beam splitting means, and a perforated plate may be used as the multiple focal point producing means in such a way that a plurality of small apertures provided in this plate are located at the focus position of the microlens array. Moreover, in this case, if the arrangement of the optical system is made so that the small apertures are also used as the minute apertures mentioned above, the design will be simplified and the small apertures of the perforated plate need not be aligned with the minute apertures.

In the disclosure so far, reference has been made to the use of the point sources or the focal points equivalent thereto. According to the present invention, however, line sources or linear focal points equivalent thereto can also be used. Since the latter may have features in common with the former, they will be briefly described below.

The microscope of the present invention, as already stated, includes a multiple line source producing means for producing a plurality of line sources arranged in an orderly array or linear focal points equivalent thereto; a scanning means for scanning in small regions surrounded by the line sources adjacent to one another or the equivalent linear focal points; linear apertures, on the detection side, located at positions conjugate with the plurality of line sources or the equivalent linear focal points; a light-receiving means composed of a plurality of light-receiving elements located at positions conjugate with the linear apertures; and a specimen image producing means for forming the image of a specimen in accordance with the amount of deflection caused by the scanning means and a signal received by the light-receiving means.

According to the present invention, the microscope is designed so that the plurality of line sources, or the equivalent linear focal points, produced by the multiple line source producing means are projected on the specimen. Thus, the blocking rate of light from the light sources is low and efficient illumination can be obtained. In order to illuminate the entire field of the specimen, the specimen can be scanned along only a segment of a line connecting adjacent line sources, or the linear focal points, projected on the specimen. Consequently, in contrast with the above case, time required for the total scan can be reduced, and this is suitable for scanning with ultrahigh speed.

In the present invention, although a confocal effect is secured only in a direction perpendicular to the longitudinal direction of the line sources or the linear focal points, a three-dimensional image can be formed by an optical sectioning effect and a high-speed three-dimensional image can be obtained by combining a scan in an axial direction. Furthermore, since it is merely necessary that the light-receiving elements are arranged at positions conjugate with the line sources or the linear focal points, the light-receiving elements, in contrast with the case of the conventional confocal microscope using the image sensor as the light-receiving means, can be designed to reduce the number and widen mutual spaces. Hence, the line sources or the linear focal points are easily aligned with the light-receiving elements.

In the present invention, the specimen image producing means includes an image forming means and an image memory, so that the image forming means writes values corresponding to signals from the light-receiving elements in predetermined addresses provided in the image memory to form the specimen image. By doing so, when a single scanning operation is completed, the image of the entire field of the specimen will be formed in the memory, and the specimen image can be observed through an image display.

Further, in the present invention, if the line sources or the linear focal points are arranged to be parallel with, and equidistant from, one another and the scanning means scans only in a direction making a right angle with the longitudinal direction of the line sources or the linear focal points, the specimen image of the entire field can be formed in a minimum of scanning time.

In the present invention, it is favorable for the scanning means to use a galvanomirror, a polygonal mirror, or an acoustooptical element. In any vase, the scanning means is simple in structure and scanning operation with high speed and stability can be performed. If a line sensor arranged in the like figure with the linear apertures is used as the light-receiving elements in the present invention, the alignment of each of the light-receiving elements is facilitated.

Additionally, if the multiple line source producing means is designed to include one line source or a plurality of line sources or a light source means for producing light equivalent thereto; a beam splitting means for splitting a light beam from the light source means into a plurality of beams; and a linear focal point producing means for producing a plurality of linear focal points from the beams split by the beam splitting means, it is possible to efficiently obtain the linear focal points with high luminance.

In this case, if a laser is used as the light source means, line sources with high luminance will be obtained. The beam splitting means may be constructed with a plurality of optical fiber elements. When light from the light source means is rendered incident on the entrance end of an optical fiber, the light can be split at the exit end thereof. If a laser array is used to combine the light source means with the beam splitting means, the design of the microscope will be simplified.

If a cylindrical lens array is used as the linear focal point producing means in the present invention, a plurality of linear focal points can be produced from a parallel beam emitted from the light source means. Where the linear focal points equivalent to the line sources are not brought about by the cylindrical lens array alone, a slit plate with a plurality of linear apertures is used in addition to the cylindrical lens array so that the linear apertures are located at respective focus positions of the cylindrical lens array. Further, if the arrangement of the optical system is made so that the linear apertures are also used as the linear apertures on the detection side mentioned above, the design becomes simple and the linear apertures of the slit plate need not be aligned with the linear apertures on the detection side. Still further, the cylindrical lens array can be employed to combine the beam splitting means with the linear focal point producing means.

The microscope of the present invention is peculiarly suitable for fluorescence observation and, as already stated, includes a light source means consisting of an ultrashort pulse laser; a beam splitting means for splitting a light beam from the light source means into a plurality of beams; a multiple focal point producing means for producing a plurality of focal points arranged in an orderly array, from the plurality of beams split by the beam splitting means; a producing means. In this way, the scanning means merely scans each of the small regions surrounded by adjacent focal points and thereby the fluorescent image over the entire field of the specimen can be obtained. Hence, in contrast with a two- or multi-photon scanning fluorescence microscope using the conventional single-beam scanning device, the image can be produced with high speed and the real-time observation becomes possible.

In the present invention, as in the above description, the specimen image producing means includes an image forming means and an image memory, so that the image forming means writes values corresponding to signals from the light-receiving elements in predetermined addresses provided in the image memory to form the specimen image. By doing so, when a single scanning operation is completed, the image of the entire field of the specimen will be formed in the memory, and the specimen image can be observed through an image display.

Further, it is favorable for the present invention that the plurality of focal points are arranged at intersections formed by two sets of equally spaced parallel lines mutually making a predetermined angle, and the scanning means scans the small regions of parallelograms into which the focal points are divided. In particular, if each of the small regions is shaped into a rectangular or square form, the design of scanning means will be facilitated. Such a favorable condition is obtained even when the focal points are arranged at equal intervals along equally spaced parallel lines making a minute angle with a scanning direction of the scanning scanning means for scanning in small regions into which the plurality of focal points are divided; a light-receiving means composed of a plurality of light-receiving elements located at positions nearly conjugate with the plurality of focal points; and a specimen image producing means for producing a fluorescent image of a specimen in accordance with the amount of deflection caused by the scanning means and a signal received by the light-receiving means.

In a fluorescence observation technique, with two- or multi-photon excitation, using an ultrashort pulse laser emitting infrared or near-infrared light, the optical sectioning effect which is the same as in the confocal observation is known by, for example, German Patent No. DE 4414940 A1. In this technique, because illumination light with which a specimen is irradiated excites fluorescent components by combining two or more photons into a set, fluorescent light equivalent to the case of excitation with a wavelength of ½ of that of the illumination light or shorter wavelengths is emitted. Since the intensity of fluorescent light is proportional to the square of that of excitation light or more power, a high intensity of fluorescent light is obtained only at the point where the excitation light is focused, and it is impossible to bring about the optical sectioning effect without providing confocal apertures on the image formation side.

Thus, in the present invention, the ultrashort pulse laser is used as the light source means, a light beam emitted therefrom is split by the beam splitting means so that a plurality of focal points arranged in an orderly array are produced by the multiple focal point means. In this case, it is only necessary that the scanning means is made to scan in only one direction, and the structure of the scanning means can be made simpler compared with the case where a two-dimensional region is scanned. Furthermore, in this case, if scanning paths in adjacent regions are made to come in contact with each other or partly to overlap, the entire specimen image with even illumination can be formed by a scan in one direction.

In the present invention, the microlens array can be used to combine the beam splitting means with the multiple focal point producing means. A plurality of optical fiber elements are also used. Consequently, the design becomes simple. It is favorable for the present invention to use a galvanomirror, a polygonal mirror, or an acoustooptical element as the scanning means. In any case, the scanning means is simple in structure and the scanning operation with high speed and stability can be performed. Moreover, when the photon counter is used as the light-receiving means and is located at a position nearly conjugate with the focal points, a two- or multi-photon fluorescent image with high sensitivity can be detected.

The microscope of the present invention is suitable for fluorescence observation and, as already stated, includes a light source means consisting of an ultrashort pulse laser; a beam splitting means for splitting a light beam from the light source means into a plurality of beams; a multiple linear focal point producing means for producing a plurality of linear focal points arranged in an orderly array, from the plurality of beams split by the beam splitting means; a scanning means for scanning in small regions surrounded by the linear focal points adjacent to one another; a light-receiving means composed of a plurality of light-receiving elements located at positions nearly conjugate with the plurality of linear focal points; and a specimen image producing means for forming a fluorescent image of a specimen in accordance with the amount of deflection caused by the scanning means and a signal received by the light-receiving means.

According to the present invention, the light beam emitted from the ultrashort pulse laser is split by the beam splitting means so that the plurality of linear focal points arranged in an orderly array are produced by the multiple linear focal point producing means. In this way, the scanning means merely scans along a segment of a line connecting adjacent linear focal points and thereby the fluorescent image over the entire field of the specimen can be obtained. Hence, in contrast with the above case, the image can be produced with high speed and the real-time observation is further favorably made.

In the present invention, as described above, the specimen image producing means includes an image forming means and an image memory, so that the image forming means writes values corresponding to signals from the light-receiving elements in predetermined addresses provided in the image memory to form the specimen image. By doing so, when a single scanning operation is completed, the image of the entire field of the specimen will be formed in the memory, and the specimen image can be observed through an image display.

Further, in the present invention, if the linear focal points are arranged to be parallel with, and equidistant from, one another and the scanning means scans only in a direction making a predetermined angle with the longitudinal direction of the linear focal points, the specimen image of the entire field can be formed in a minimum of time.

In the present invention, a plurality of optical fiber elements can be used as the beam splitting means. It is favorable that a galvanomirror, a polygonal mirror, or an acoustooptical element is used as the scanning means. In any case, the design is simple and scanning operation with high speed and stability can be performed. If a photon counter is used as the light-receiving means and is located at a position conjugated with the focal points, a two- or multi-photon fluorescent image with high sensitivity can be detected.

If a cylindrical lens array is used as the multiple linear focal point producing means in the present invention, a plurality of linear focal points can be produced from a parallel beam emitted from the light source means. It is possible for the cylindrical lens array to combine the beam splitting means with the multiple linear focal point producing means. Where the linear focal points are not brought about by the cylindrical lens array alone, the slit plate mentioned above can be placed in addition to the cylindrical lens array.

Subsequently, a description will be given of three design means which offer great convenience, when additionally provided, to the microscope of the present invention so far discussed. The first means refers to a split-beam control means. This control means is capable of increasing or decreasing the number of beams split by the beam splitting means. In this way, the amount of light of spots collected on the specimen can be adjusted and efficient illumination is obtained. For example, in the case where an object or a part to be observed is restricted by the region of part of the field of the endoscope, when illumination light is collected only in an observation region an observer desires, the number of split beams decreases and thus the amount of light of spots increases, resulting in easy observation. In particular, where the specimen has a dark portion which is difficult to observe, the number of split beams is reduced to collect light, and thereby the specimen can be observed.

In the microscope suitable for fluorescence observation, mentioned above, the illumination range of excitation light is restricted and thereby unnecessary bleaching of fluorescent pigment can be prevented. Furthermore, if the spot-to-spot spacing of illumination light is changed, various modes can be selected. Specifically, if the spot-to-spot spacing of illumination light on the specimen field is increased to reduce the total number of spots, the mode that the scanning time is much but an image is bright will be obtained. Conversely, if the spot-to-spot spacing is narrowed to increase the number of spots, the mode that the image is darker but the scanning time is less will be obtained. Further, if the spot-to-spot spacing and the illumination range are narrowed, the mode that the scanning time is less and the image is brighter can be attained. It is also possible that the total number of spots of the illumination light on the specimen field is reduced to regulate the number of light-receiving elements used.

For such a split-beam control means, it is considered to use a variable beam diameter optical system, which is interposed between the light source means and the beam splitting means so as to change the diameter of a light beam incident from the light source means on the beam splitting means. By doing so, the number of split beams can be adjusted.

The second means refers to a projection magnification control means. For this control means, a zoom lens is most suitable, and when a plurality of light sources or focal points which have been produced are projected on the specimen, the magnification of this projection can be adjusted. By providing such a control means, the spot-to-spot spacing of the illumination light and the illumination range on the specimen field can be adjusted. Consequently, illumination is restricted within the region of part of the specimen field, thereby preventing unnecessary bleaching of fluorescent pigment. In this way, as in the split-beam control means, it becomes possible to bring about various uses and the function and effect involved therein.

The third means is a projection position control means. By providing this control means, the position of illumination on the specimen field can be adjusted. As a result, illumination is restricted within the region of part of the specimen field and thereby, for example, unnecessary bleaching of fluorescent pigment can be prevented. In this way, as in the split-beam control means, it becomes possible to bring about various uses and the function and effect involved therein. In the projection position control means, there are cases where it is placed in the optical paths of a plurality of light sources or focal points which have been produced and where it is interposed between the light source means and the beam splitting means. In the former case, it is possible to combine a beam deflecting means and the scanning means which are placed in the optical path, while in the latter, the position where the light beam from the light source means is incident on the beam splitting means is adjusted. In the former, a resonant galvanomirror is adopted as the scanning means, and the position of illumination can be adjusted even when a deflecting region is not easily controlled by the scanning means.

Figure 3:
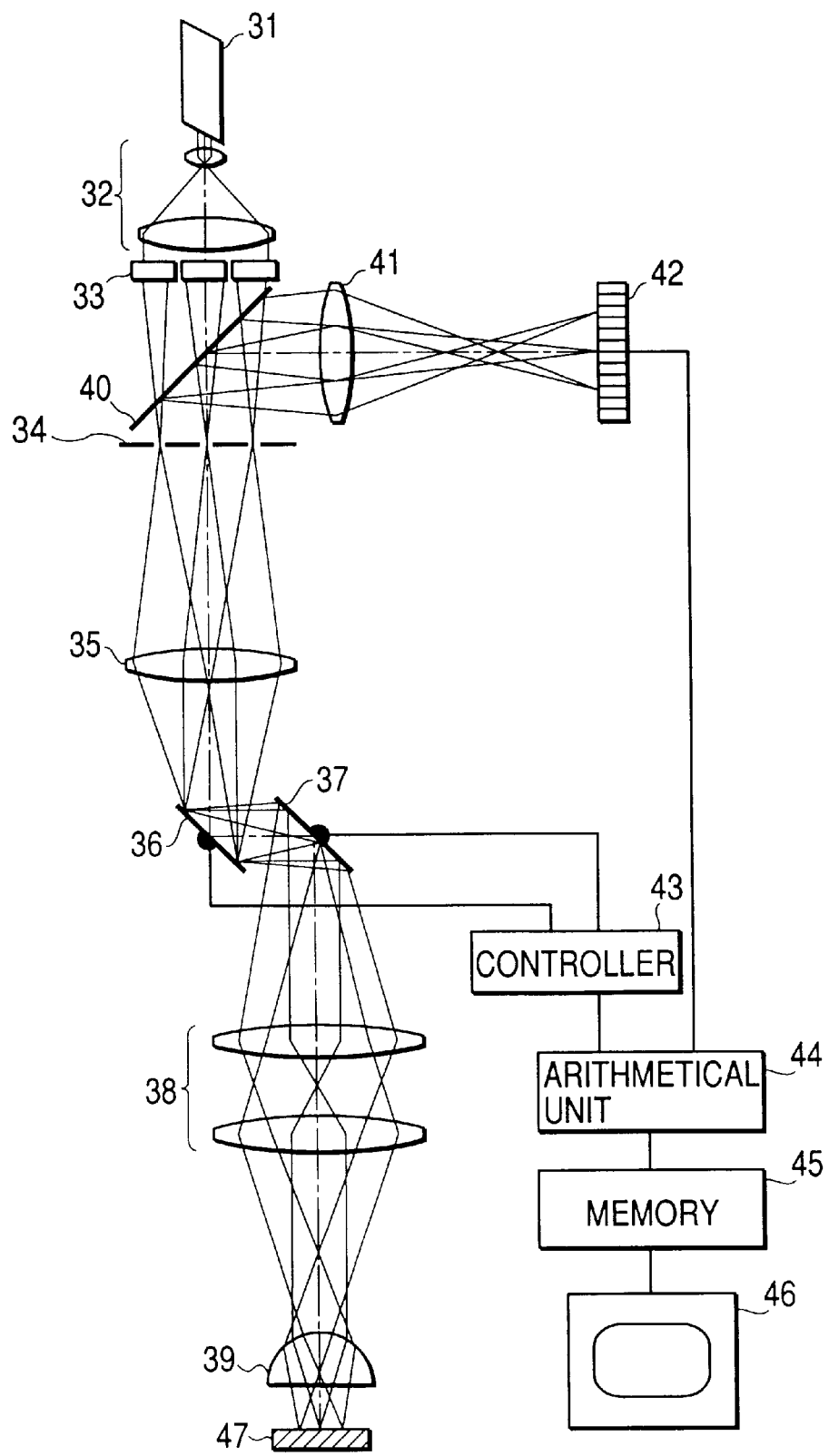
FIG. 3 is a view showing the construction of a first embodiment of a scanning microscope according to the present invention.

In accordance with the drawings, the embodiments of the present invention will be described in detail below. The first embodiment, as shown in FIG. 3, includes a laser 31 used as the light source means; a beam expander 32; a microlens array 33 as the beam splitting means and the multiple focal point producing means; a confocal plate 34 consisting of a perforated plate which combines the multiple point source producing means with the minute apertures on the detection side; a first relay lens 35; a first galvanomirror 36 and a second galvanomirror 37 as the scanning means; a second relay lens 38; an objective lens 39; a half mirror 40; a photographic lens 41; an image sensor 42 as the light-receiving means; a controller 43, an arithmetical unit 44, and a memory 45 which constitute the specimen image producing means; and a TV monitor 46. Reference numeral 47 represents a specimen.

In the first embodiment constructed as mentioned above, light emitted from the laser 31 passes through the beam expander 32 so that its beam diameter is enlarged, and is incident as parallel rays on the microlens array 33. Since the microlens array 33 has the structure that a plurality of minute lenses with identical properties are arranged in an orderly array, incident parallel rays are converged by respective lenses of the microlens array 33 and are regularly arranged at their focus position. The confocal plate 34 having a plurality of minute apertures is placed at the focus position, and thus multiple point sources equivalent to a plurality of point sources arranged in an orderly array are produced there.

Respective point sources in this case are arranged at sufficient intervals so that light emitted therefrom is collected on the specimen 47 without interfering with one another. For this respect, according to E. M. McCabe et al., "Direct-view microscopy: optical sectioning strength for finite-sized, multiple-pinhole arrays", Journal of Microscopy, Vol. 184, Pt. 2, November 1996, pp. 95–105, it is described that the size about 10 times the spot diameter on the specimen surface is suitable for each of intervals between respective point sources.

The two galvanomirrors 37 and 38 are arranged close to each other and are both connected to the controller 43 so that they are operated synchronously. When light beams emitted from respective point sources on the confocal plate 34 are collected through the first relay lens 35 on the first galvanomirror 36, the first galvanomirror 36 deflects the light beams in one direction (along an x axis) to scan, while the second galvanomirror 37 further deflects these deflected beams in a direction perpendicular thereto (along a y axis) to scan. A scanning path S in this case, as shown in FIG. 4A, covers a small region which is surrounded by four adjacent point sources P on the specimen surface.

The light beams deflected by the two galvanomirrors 36 and 37 are collected again by the second relay lens 38. The objective lens 39 is placed so that an exit pupil is located close to the position where the light is collected. The light beams passing through the objective lens 39 are reflected by the surface of the specimen 47 placed at a position conjugate with the confocal plate 34. Reflected beams follow reverse paths and are transmitted through the minute apertures of the confocal plate 34 from a reverse direction, thereby bringing about the confocal effect. After that, some of the light beams are deflected at right angles by the half mirror 40 without returning to the microlens array 33, and confocal images are projected and formed on the image sensor 42 by the photographic lens 41. It is needless to say that the image sensor 42 is an assembly of a plurality of light-receiving elements arranged in an orderly array, corresponding to the minute apertures of the confocal plate 34, so that these light-receiving elements independently receive light beams emerging from respective apertures of the confocal plate 34.

Signals of the light-receiving elements are inputted into the arithmetical unit 44 from the image sensor 42, and the amount of deflection of the two galvanomirrors 36 and 37 is inputted thereinto from the controller 43. Here, the arithmetical unit 44 is to write values corresponding to the signals of the light-receiving elements in addresses, within the memory 45, calculated by using position coordinates of the light-receiving elements previously stored and the amount of deflection of the galvanomirrors 36 and 37. When a single scanning operation is completed, the image of the entire field of the specimen 47 will be written in the memory 45, and the specimen image is displayed on the TV monitor 46 connected to the memory 45 so that visual observation can be made.

Figure 4A:
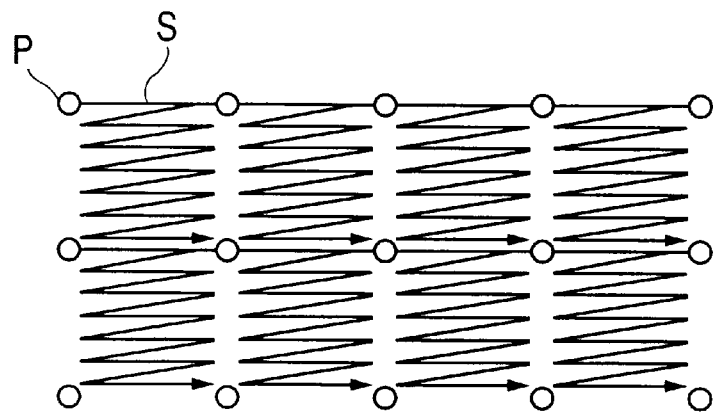
FIGS. 4A, 4B, and 4C are views showing scanning paths in the first embodiment.
Figure 4B:
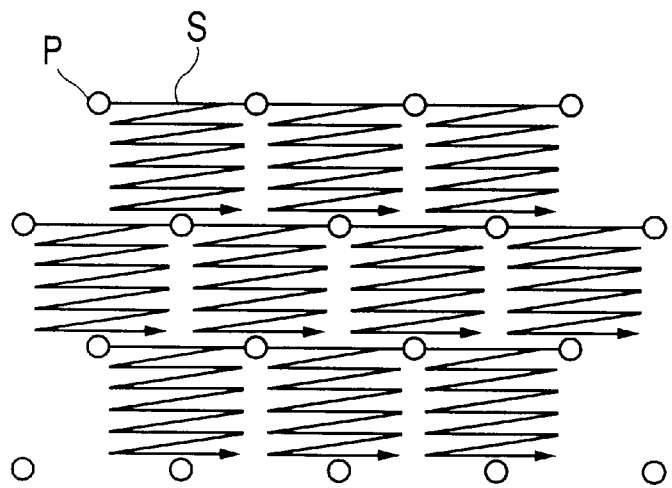
Figure 4C:
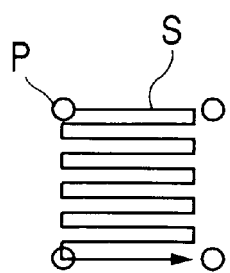

In the first embodiment, as will be understood from the explanation relative to FIG. 4A, the arrangements of the microlens array 33 and the minute apertures of the focal plate 34, that is, the arrangement of the point sources P displays the array of tetragonal shape. If the point sources P are only arranged in an orderly array, they may have the array of any other shape. For example, as shown in FIG. 4B, the point sources P may have the array of hexagonal lattice shape. In such a case also, the scanning operation is performed in each of the small regions in which the point sources P are divided. In the scanning path S depicted in each of FIGS. 4A and 4B, the scanning operation is repeatedly performed in one direction. However, as depicted in FIG. 4C, it may be performed in a turnaround way and thereby time required for the total scanning operation can be reduced.

In the first embodiment, the galvanomirror is used as the scanning means, but some other member, for example, a polygonal mirror or an acoustooptical element may be employed. The first embodiment can be partially modified to make the fluorescence observation. In this case, it is merely necessary to use a dichroic mirror instead of the half mirror 40 and place an absorption filter which absorbs the wavelength of light emitted from the laser 31 and transmits only fluorescent light emanating from the fluorescent pigment used, between the dichroic mirror and the image sensor 42.

Figure 5:
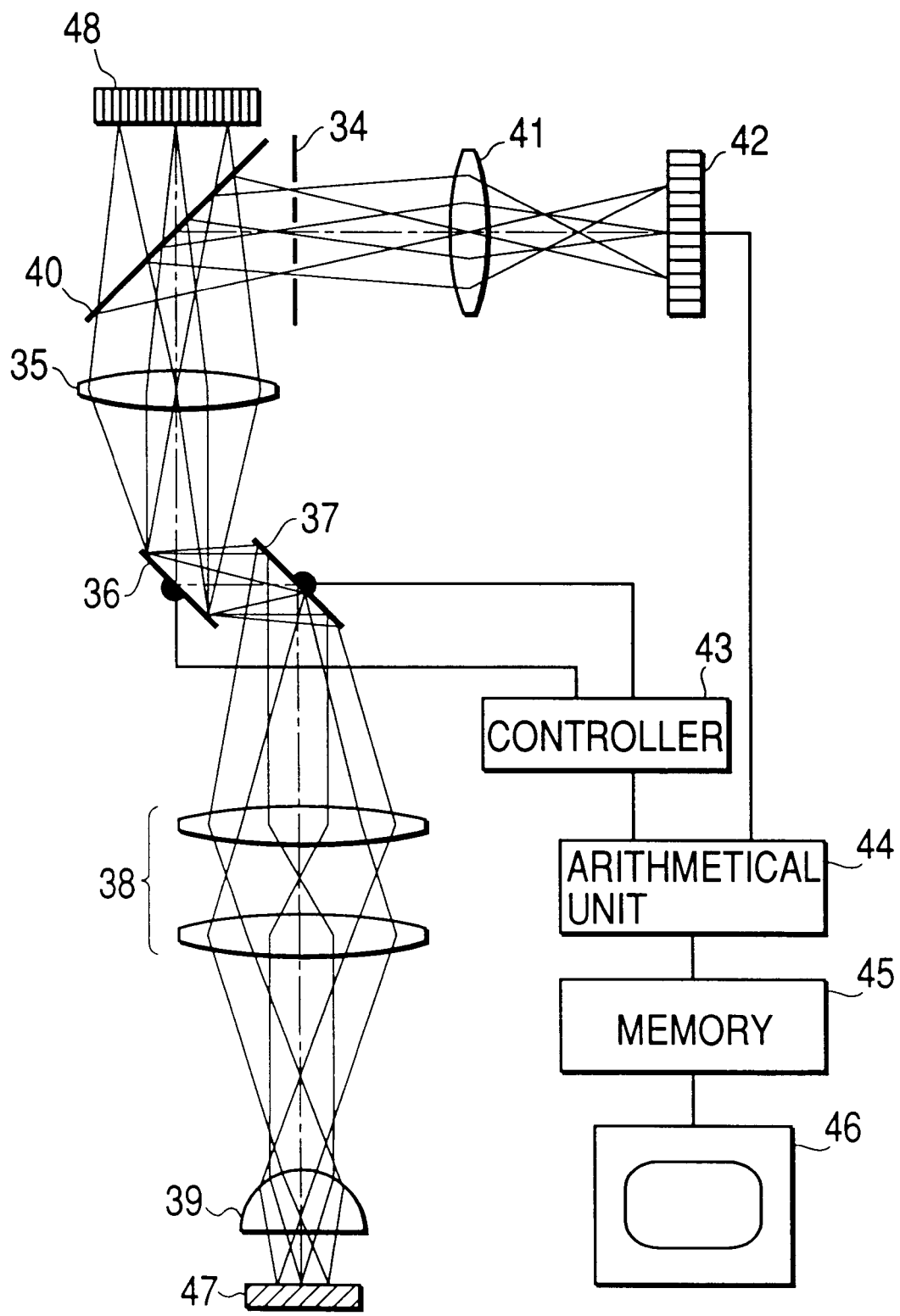
FIG. 5 is a view showing the construction of a modified example of the first embodiment.
Figure 6:
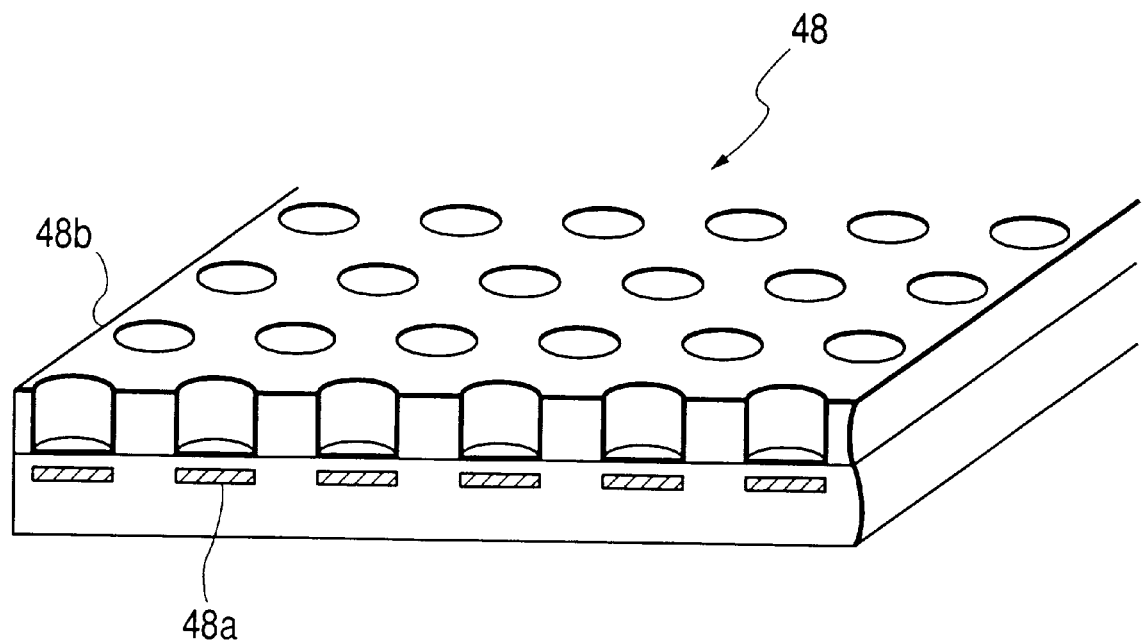
FIG. 6 is an explanatory view showing the structure of a diode laser matrix in FIG. 5.

The first embodiment can also be modified as shown in FIG. 5. This modified example is such that a diode laser matrix 48 itself includes the multiple point source producing means. The diode laser matrix 48, as shown in FIG. 6, has a substrate 48b including a resonator, placed on a plurality of activated regions 48a arranged in a matrix form, and can be thought of as an array of a plurality of point sources. In this case, the confocal plate 34, as shown in FIG. 5, is located at a position conjugate with the diode laser matrix 48. Also, in FIG. 5, like numerals indicate like elements with respect to FIG. 3, and thus the explanation of these elements is omitted.

Figure 7:
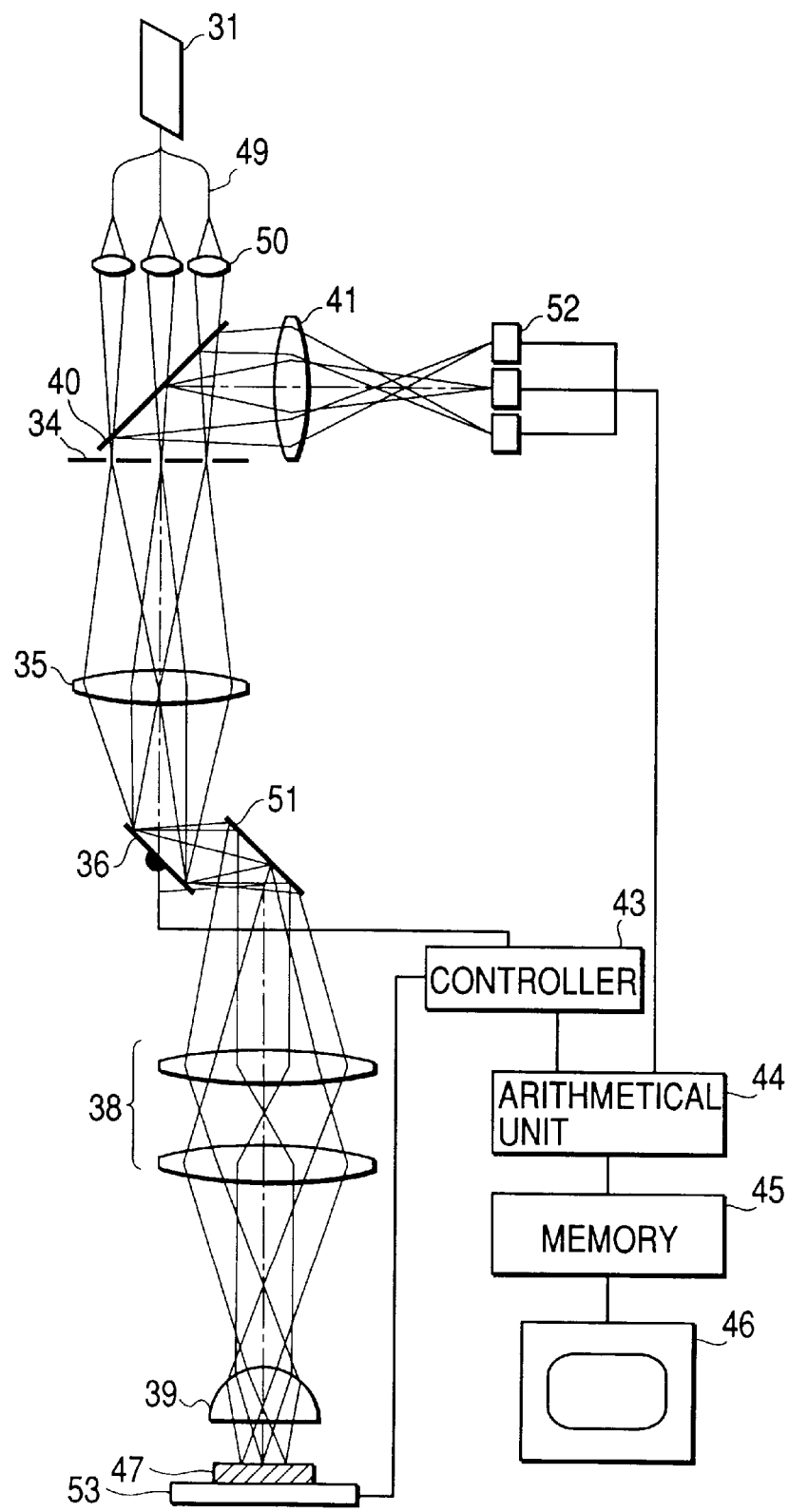
FIG. 7 is a view showing the construction of a second embodiment of the scanning microscope according to the present invention.

Subsequently, the second embodiment is explained with reference to FIG. 7. In this figure, like numerals indicate like elements with respect to FIG. 3. The second embodiment includes the laser 31 used as the light source means; an optical fiber 49 as the beam splitting means; a cylindrical lens array 50 constituting the linear focal point producing means, together with the confocal plate (slit plate) 34; the first relay lens 35; the galvanomirror 36 as the scanning means; a mirror 51; the second relay lens 38; the objective lens 39; the half mirror 40; the photographic lens 41; a line sensor 52 as the light-receiving means; the controller 43, the arithmetical unit 44, and the memory 45 which constitute the specimen image producing means; the TV monitor 46; and a stage drive 53 for moving the specimen 47.

A light beam emitted from the laser 31 is split up by the optical fiber 49 composed of a plurality of optical fiber elements and then is incident on the cylindrical lens array 50. Respective split beams form a plurality of linear focal points, corresponding to the arrangement of the cylindrical lens array 50, and the confocal plate 34 is located at the focus position of the lens array 50. The confocal plate 34, unlike that of the first embodiment, has a plurality of slit apertures and constitutes the multiple line source producing means, together with the laser 31, the optical fiber 49, and the cylindrical lens array 50. Also, the multiple line source producing means may be constructed with a known laser array and the cylindrical lens array 50.

In this way, the light beams passing through the confocal plate 34 are collected through the first relay lens 35 on the galvanomirror 36, which deflects linearized beams at right angles to scan. The light beams deflected by the galvanomirror 36, after being reflected by the mirror 51, are collected again by the second relay lens 38 and reach the surface of the specimens 47 through the objective lens 39 located at the position where the beams are collected, coinciding with the exit pupil. The light beams reflected from the surface of the specimen follow reverse paths and are further collected on the confocal plate 34 by the relay lens 35, bringing about the confocal effect. After that, some of the light beams transmitted through the slit apertures of the confocal plate 34 are deflected by the half mirror 40 without returning to the cylindrical lens array 50 and are collected on the line sensor 52 by the photographic lens 41. In this way, the specimen image is formed on the line sensor 52.

The amount of deflection of the galvanomirror 36 is inputted into the arithmetical unit 44 from the controller 43, and imaging signals are inputted thereinto from the line sensor 52. The memory 45 is connected to the arithmetical unit 44, and addresses calculated by position coordinates of the light-receiving elements of the line sensor 52, previously stored, and the amount of deflection of the galvanomirror 36 are set therein. Thus, the arithmetical unit 44 writes values corresponding to the imaging signals inputted from the light-receiving elements of the line sensor 52 in the addresses. When a single scanning operation is completed, the image of the entire field of the specimen 47 will be written in the memory 45, and is displayed on the TV monitor 46 connected to the memory 45.

In the second embodiment, the stage drive 53 is connected to the controller 43 so that the specimen 47 can be moved vertically (along the optical axis). Hence, whenever the single scanning operation of the specimen surface is completed by the galvanomirror 36, the specimen 47 is moved little by little and confocal images at the positions of the plurality of focal points are introduced into the arithmetical unit 45. Consequently, on the basis of these confocal images, a three-dimensional image is formed by the arithmetical unit 44 and is displayed on the TV monitor 46.

Thus, the second embodiment, because it is constructed as a confocal apparatus using linear apertures (slits), is somewhat inferior in confocal property to that using point apertures as in the first embodiment. The second embodiment, however, has the advantage that the scanning operation for one picture plane is completed in a minimum of time and thus the three-dimensional image is formed with high speed while the focus position is shifted. In the second embodiment as well, the fluorescence observation can be made by altering the arrangement. In this case, it is merely necessary to use a dichroic mirror instead of the half mirror 40 and place an absorption filter which absorbs wavelengths of light emitted from the laser 31 and transmits only fluorescent light emanating from the fluorescent pigment used, between the dichroic mirror and the line sensor 52.

Figure 8:
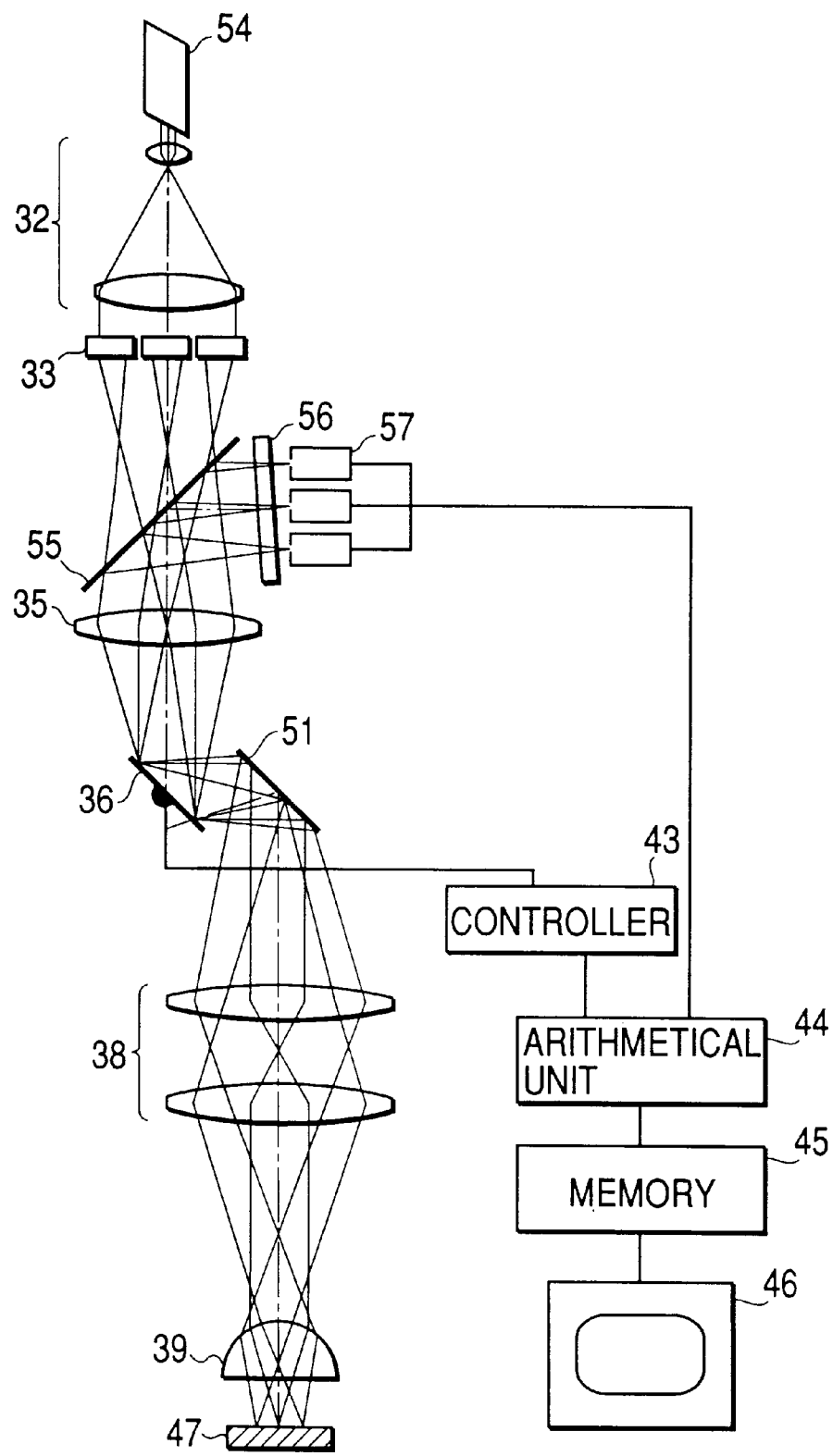
FIG. 8 is a view showing the construction of a third embodiment of the scanning microscope according to the present invention.

Subsequently, the third embodiment is explained with reference to FIGS. 8, 9A, and 9B. In FIG. 8, like numerals indicate like elements with respect to FIGS. 3 and 7. The third embodiment includes a titanium sapphire laser 54 used as the light source means; the beam expander 32; the microlens array 33 as the beam splitting means and the multiple focal point producing means; the first relay lens 35; the galvanomirror 36 as the scanning means; the mirror 51; the second relay lens 38; the objective lens 39; a dichroic mirror 55; an absorption filter 56; a photon counter 57 as the light-receiving means; the controller 43, the arithmetical unit 44, and the memory 45 which constitute the specimen image producing means; and the TV monitor 46.

A light beam emitted from the titanium sapphire laser 54 is expanded by the beam expander 32 and is split into a plurality of beams by the microlens array 33. Individual split beams form focal points equivalent to a plurality of point sources with a pattern corresponding to the lens arrangement of the microlens array 33. The first relay lens 35 collects light beams from the focal points of the microlens array 33 on the galvanomirror 36, which deflects the light beams in one direction, namely along the x axis, to scan. The light beams deflected by the galvanomirror 36 are reflected by the mirror 51 and deflected toward the second relay lens 38.

Figure 9A:
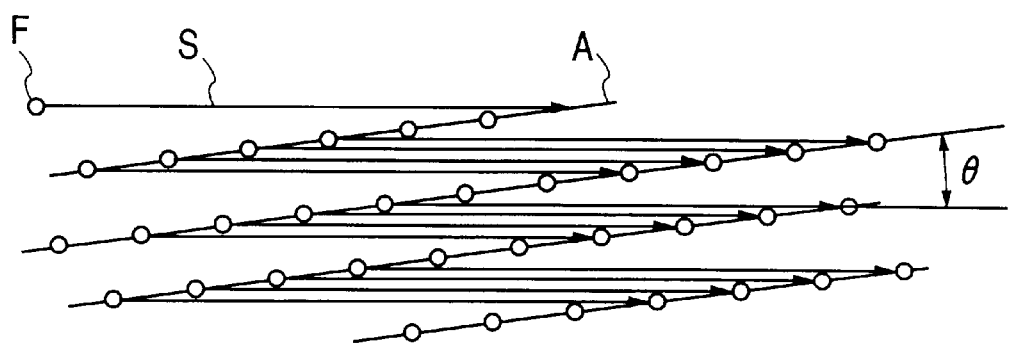
FIG. 9A is a view showing the relationship between the array of focal points and the scanning path in the third embodiment.
Figure 9B:
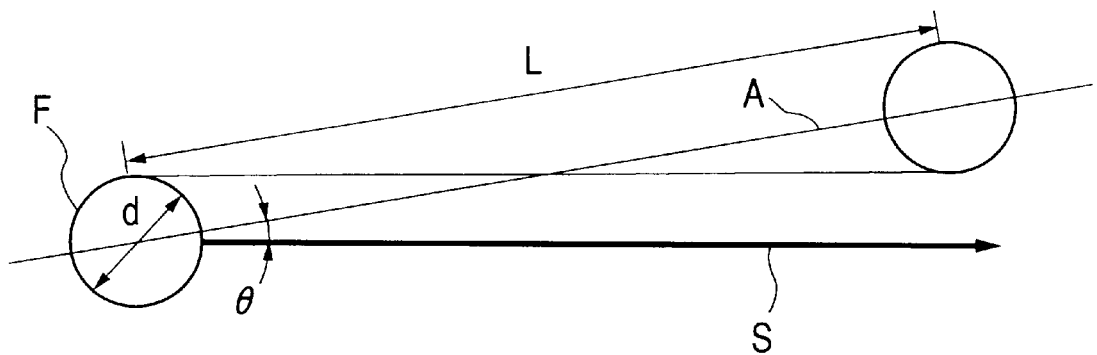
FIG. 9B is a partially enlarged view of FIG. 9A.

In the third embodiment, as shown in FIG. 9A, focal points F produced by the microlens array 33 are equally spaced along an axis A making a minute angle $\theta$ with the scanning direction of the galvanomirror 36. The scanning operation is performed by the galvanomirror 36 with respect to only the one-dimensional scan in the direction of the x axis as mentioned above. As shown in an enlarged way in FIG. 9B, when the diameter of each of the focal points F is denoted by d and a space between the focal points F by L, an arrangement is made so that the angle $\theta$ made by the axis A of an array of focal points with the scanning direction satisfies the relation: $\tan \theta \leq d/L$. Hence, even in the one-dimensional scan performed by the galvanomirror 36, the scanning paths of the focal points are superposed and the region of the entire field on the specimen surface is evenly illuminated.

The scanning operation is performed as mentioned above. The light beams deflected by the mirror 51 are collected again by the second relay lens 38 and after passing through the objective lens 39 located at the position where the beams are collected, coinciding with the exit pupil, are collected on the surface of the specimen 47 located at the position conjugate with the focal points of the microlens array 33. Collected illumination light induces fluorescent light due to the two- or multi-photon excitation in the vicinity of the focus position. The fluorescent light produced in this way follows a reverse path, and after being transmitted through the first relay lens 35, is deflected in a direction different from that of the microlens array 33 by the dichroic mirror 55. After excitation light reflected and returned from the middle of the optical path is removed by the absorption filter 56, the fluorescent light is collected on the light-receiving surface of the photon counter 57 located at the position conjugate with the focal points of the microlens array 33.

The amount of deflection of the galvanomirror 36 is inputted into the arithmetical unit 44 from the controller 43, and imaging signals are inputted thereinto from the photon counter 57. The memory 45 is connected to the arithmetical unit 44, and addresses calculated by position coordinates of a plurality of minute apertures on the light-receiving surface of the photon counter 57, previously stored, and the amount of deflection of the galvanomirror 36 are set therein. Thus, the arithmetical unit 44 writes values corresponding to the imaging signals inputted from the photon counter 57 in the addresses. When a single scanning operation is completed, the image of the entire field of the specimen 47 will be written in the memory 45, and is displayed on the TV monitor 46 connected to the memory 45.

According to the third embodiment, as described above, it is only necessary that the scanning operation is performed only in the direction of the x axis by the scanning means, and thus in contrast with the confocal microscope using the conventional single-beam scanning device, the scanning operation for one picture plane is completed with much higher speed. For the light-receiving elements in the third embodiment, the photon counter is used and hence a two- or multi-photon fluorescent image with superhigh sensitivity can be observed.

So far, the above three embodiments have been described. Even when the components of these embodiments are mutually combined, the objects of the present invention are accomplished and the predetermined effect can be brought about. For example, the scanning means used in the third embodiment may be employed in the first embodiment.

Figure 10A:
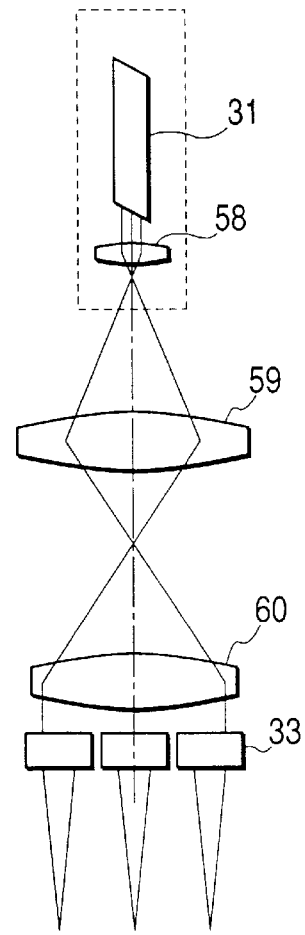
FIGS. 10A, 10B, and 10C are views for explaining the construction of a fourth embodiment of the scanning microscope according to the present invention.
Figure 10B:
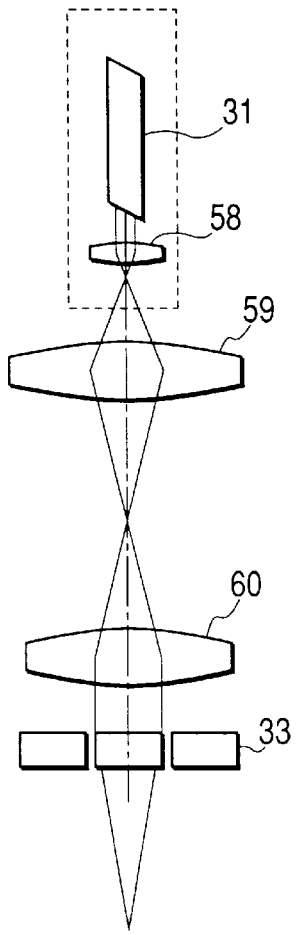
Figure 10C:
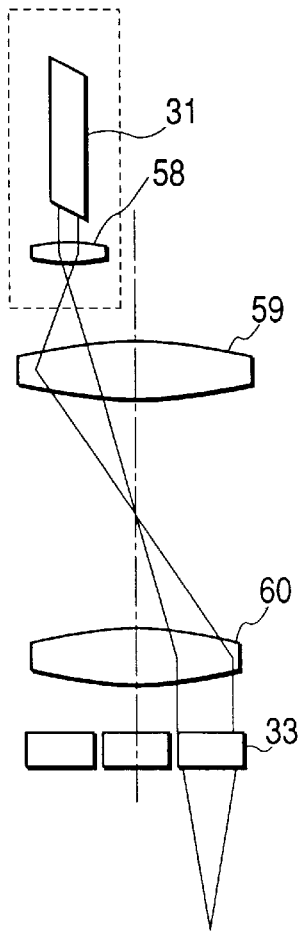

Subsequently, the fourth embodiment is explained with reference to FIGS. 10A–10C. This embodiment is designed so that when the microlens array 33 is used as the multiple point source producing means as in the first and third embodiments, an illumination area relative to the microlens array 33 can be adjusted. Thus, in FIGS. 10A–10C, only components required for the explanation are shown, and like numerals indicate like members. The fourth embodiment shown in these figures includes the laser 31 used as the light source means; three lenses 58, 59, and 60; and the microlens array 33. The lens 58 is integrally constructed with the laser 31. The lenses 59 and 60 constitute a variable beam diameter optical system, so that a distance between the lenses 59 and 60 is changed, and thereby a light beam emitted from the laser 31 changes in diameter to adjust the illumination area relative to the microlens array 33. FIG. 10A shows the case where the microlens array 33 is illuminated in a wide range, while FIG. 10B shows the case where only its center portion is illuminated.

In the fourth embodiment, an integral construction section including the laser 31 and the lens 58 and an optical system including the lenses 59 and 60 and the microlens array 33 can be relatively moved in a direction perpendicular to the optical axis, and constitute a projection position control means. Hence, when the distance between the lenses 59 and 60 is held large as shown in FIG. 10B and the laser 31 and the lens 58 are decentered from the optical axis of these lenses, the illumination part of the microlens array 33, namely of the specimen, can be controlled. FIG. 10C shows an example where illumination is controlled in this way.

Thus, according to the fourth embodiment, by changing the distance between the lenses 59 and 60 or decentering the lens 58 from the optical axis, only a necessary part can be observed in the field region of the microscope and thus there is the advantage of being easy to observe without devoting attention to other parts. Moreover, there is the additional advantage that, for example, even when the object is dark, its dark portion can be made bright for observation because the light emitted from the laser 31 can be concentrated in a limited region for illumination.

In the fourth embodiment, as mentioned above, an illumination region is controlled in such a way that the distance between the lenses 59 and 60 is changed or the lens 58 is decentered. However, the present invention is not limited to such an arrangement, and various arrangements are considered. For example, a plurality of optical systems may be previously provided so that they can be switched over and used.

Figure 11A:
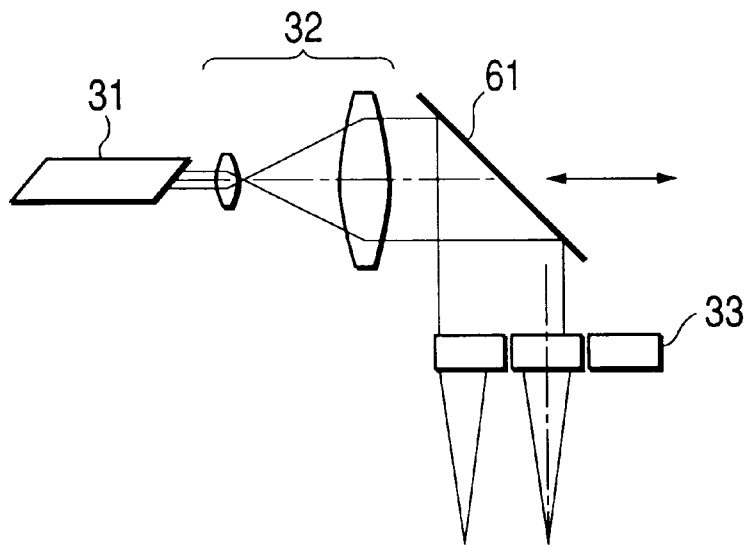
FIGS. 11A and 11B are views modified examples of the fourth embodiments.
Figure 11B:
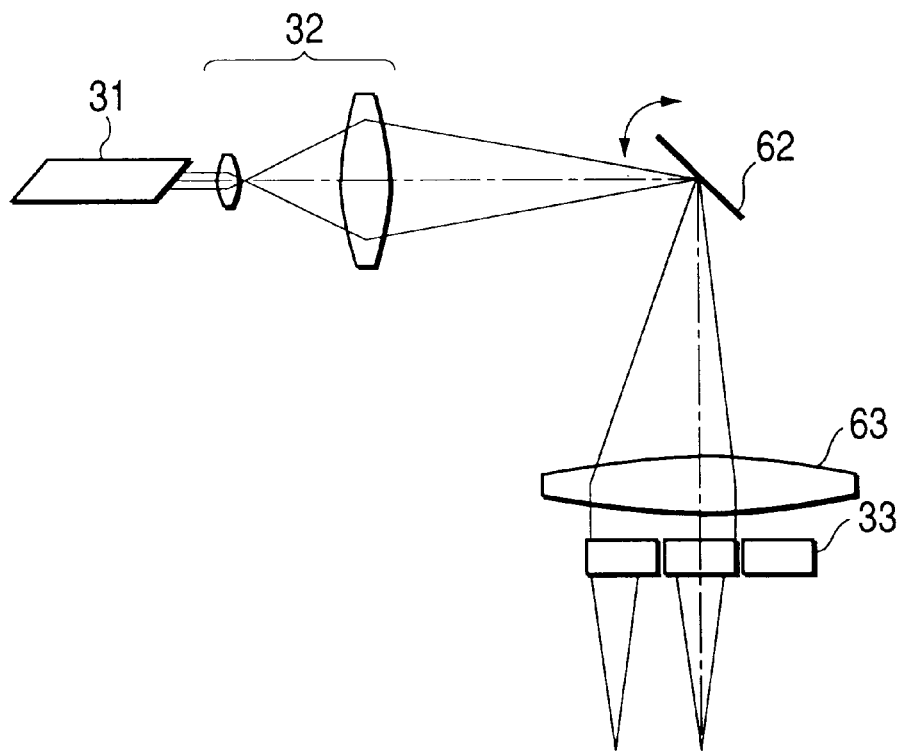

Two modification examples are shown in FIGS. 11A and 11B. In these modification examples, mirrors 61 and 62 are respectively interposed between the beam expander 32 and the microlens array 33. The modification example shown in FIG. 11A is designed so that the mirror 61 is moved in a lateral direction as indicated by an arrow in the figure, while that shown in FIG. 11B is such that the inclination of the mirror 62 is changed in a direction indicated by an arrow in the figure. Also, in FIG. 11B, a lens 63 is placed so that even when the inclination of the mirror 62 is changed, a light beam is incident on the microlens array 33.

Figure 12:
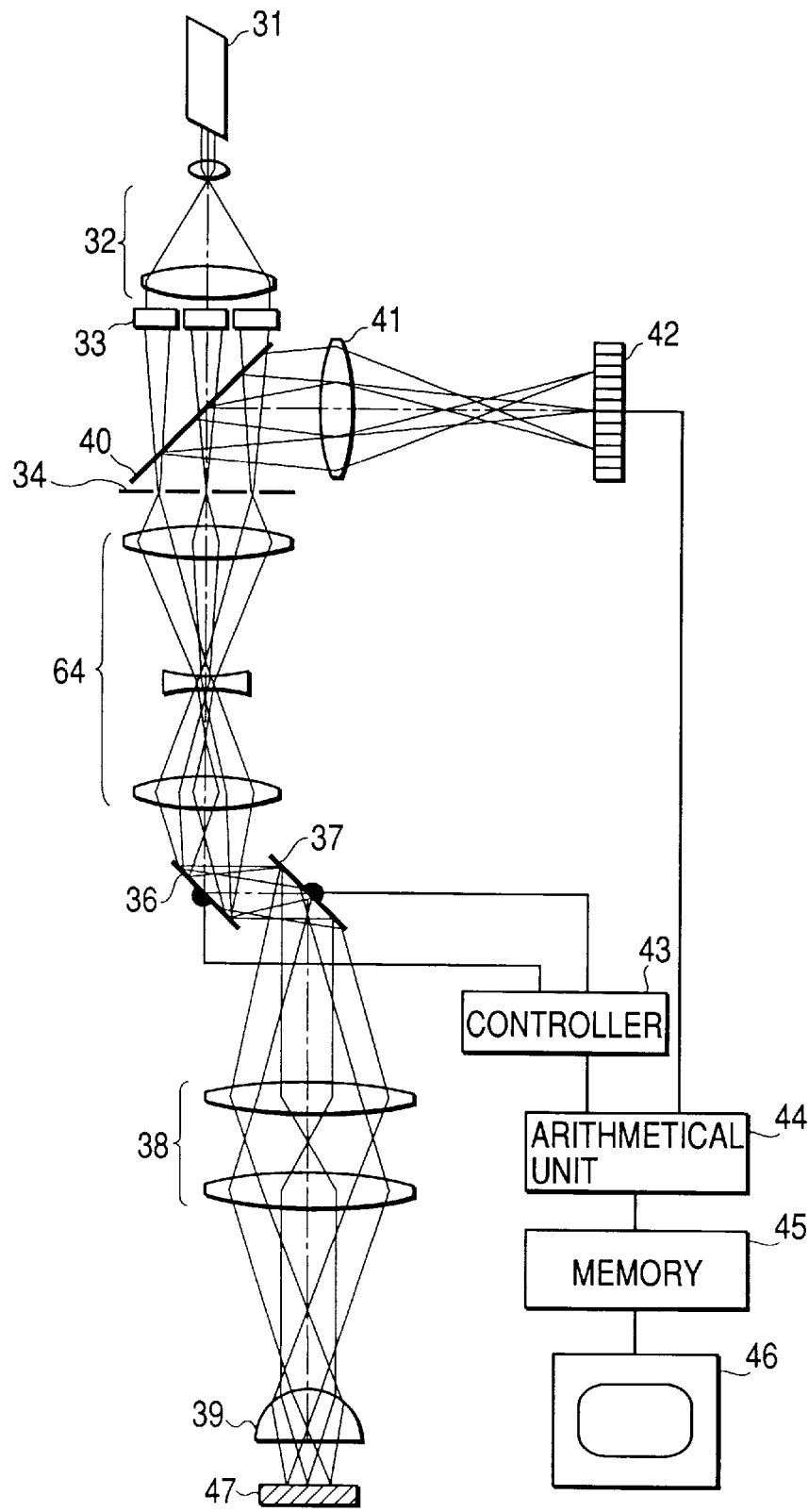
FIG. 12 is a view showing the construction of a fifth embodiment of the scanning microscope according to the present invention.

Finally, the fifth embodiment is described with reference to FIG. 12. In this embodiment, a zoom lens unit 64 composed of three lenses with positive, negative, and positive powers is placed at the position of the first relay lens 35 in the first embodiment, thereby providing the functions of the two galvanomirrors 36 and 37 which are different from those of the first embodiment. Thus, like numerals are used for like elements with respect to FIG. 3, and the explanation of these elements is omitted.

In the fifth embodiment, a light beam emitted from the laser 31, after being expanded by the beam expander 32, is split up into a plurality of beams by the microlens array 33 so that individual focal points are formed on the minute apertures of the confocal plate 34 and thereby point sources arranged in an orderly array are produced. A plurality of point sources thus produced, after the magnification of projection is controlled by a variable magnification optical system, that is, the zoom lens unit 64, are projected on the specimen 47 through the two galvanomirrors 36 and 37, the relay lens 38, and the objective lens 47. For the projection of the point sources, the two galvanomirrors 36 and 37 are designed to adjust the starting point of the scanning operation through the controller 43, and therefore the position of illumination on the specimen 47 can be adjusted.

In this way, according to the fifth embodiment, the zoom lens unit 64 is controlled and thereby the illumination area of the specimen 47 can be changed. Furthermore, by adjusting the starting point of the scanning operation of the two galvanomirrors 36 and 37, the position of illumination on the specimen 47 can also be changed. It thus becomes possible that only a necessary place in the field of the specimen is illuminated so that unnecessary illumination is eliminated. Additionally, when the magnification of projection is made low, the scanning time required to produce one picture plane can be reduced because spaces between respective point sources become narrow on the specimen.

Also, in the fifth embodiment, the beam diameters of the point sources at the pupil position of the objective lens 39 change with the magnification of projection. However, if provision is made to fill the diameter of the pupil of the objective lens 39 with the beam diameters when the magnification is maximized, the resolving power of the objective lens 39 can be maintained.

What is claimed is:

1. A scanning confocal microscope comprising:

multiple point source producing means for producing a plurality of point sources arranged in an orderly array or focal points equivalent thereto;

scanning means for scanning in small regions into which said plurality of point sources or said focal points are divided;

a plurality of minute apertures, on a detection side, located at positions conjugate with said plurality of point sources or said focal points;

light-receiving means composed of a plurality of light-receiving elements for independently receiving light transmitted through said plurality of minute apertures; and specimen image producing means for forming an image of a specimen in accordance with an amount of deflection caused by said scanning means and a signal received by said light-receiving means.

2. A scanning confocal microscope comprising:

multiple line source producing means for producing a plurality of line sources arranged in an orderly array or linear focal points equivalent thereto;

scanning means for scanning in small regions surrounded by said plurality of line sources adjacent to one another or said linear focal points;

linear apertures, on a detection side, located at positions conjugate with said plurality of line sources or said linear focal points;

light-receiving means composed of a plurality of light-receiving elements located at positions conjugate with said linear apertures; and specimen image producing means for forming an image of a specimen in accordance with an amount of deflection caused by said scanning means and a signal received by said light-receiving means.

3. A scanning fluorescence microscope comprising:

light source means consisting of an ultrashort pulse laser;

beam splitting means for splitting a light beam from said light source means into a plurality of beams;

multiple focal point producing means for producing a plurality of focal points arranged in an orderly array, from said plurality of beams split by said beam splitting means;

scanning means for scanning in small regions into which said plurality of focal points are divided;

light-receiving means composed of a plurality of light-receiving elements located at positions nearly conjugate with said plurality of focal points; and specimen image producing means for producing a fluorescent image of a specimen in accordance with an amount of deflection caused by said scanning means and a signal received by said light-receiving means.

4. A scanning fluorescence microscope comprising:

light source means consisting of an ultrashort pulse laser;

beam splitting means for splitting a light beam from said light source means into a plurality of beams;

multiple linear focal point producing means for producing a plurality of linear focal points arranged in an orderly array, from said plurality of beams split by said beam splitting means;

scanning means for scanning in small regions surrounded by said plurality of linear focal points adjacent to one another;

light-receiving means composed of a plurality of light-receiving elements located at positions nearly conjugate with said plurality of linear focal points; and specimen image producing means for forming a fluorescent image of a specimen in accordance with an amount of deflection caused by said scanning means and a signal received by said light-receiving means.

5. A scanning confocal microscope according to claim 1, wherein said specimen image producing means includes image forming means and an image memory, so that addresses representing locations on said specimen calculated from position coordinates on respective surfaces of said light-receiving elements and the amount of deflection caused by said scanning means are preset in said image memory, and values corresponding to signals from said light-receiving elements are written in said addresses by said image forming means to form an image of said specimen.

6. A scanning confocal microscope according to claims 1 or 5, wherein said plurality of point sources or said focal points are arranged at intersections formed by two sets of equally spaced parallel lines mutually making a predetermined angle, and said scanning means scans each of small regions of parallelograms into which said plurality of focal points are divided.

7. A scanning confocal microscope according to claim 6, wherein said predetermined angle is a right angle and each of said small regions is shaped into a rectangular or square form.

8. A scanning confocal microscope according to claims 1 or 5, wherein said plurality of point sources or focal points are arranged at equal intervals along equally spaced parallel lines making a minute angle with a scanning direction of said scanning means, said scanning means scanning in only one direction.

9. A scanning confocal microscope according to claim 8, wherein said minute angle is set so that when said plurality of point sources or said focal points are scanned by said scanning means, adjacent scanning paths come in contact with each other or partly overlap.

10. A scanning confocal microscope according to claim 1, wherein said multiple point source producing means includes light source means for producing one point source or a plurality of point sources or light equivalent thereto; beam splitting means for splitting a light beam from said light source means into a plurality of beams; and multiple focal point producing means for producing a plurality of focal points from said plurality of beams split by said beam splitting means.

11. A scanning confocal microscope according to claim 2, wherein said specimen image producing means includes image forming means and an image memory, so that addresses representing locations on said specimen calculated from position coordinates on respective surfaces of said light-receiving elements and the amount of deflection caused by said scanning means are preset in said image memory, and values corresponding to signals from said light-receiving elements are written in said addresses by said image forming means to form an image of said specimen.

12. A scanning confocal microscope according to claim 2, wherein said plurality of line sources or said linear focal points are arranged to be parallel with, and equidistant from, one another and said scanning means scans only in a direction making a predetermined angle with a longitudinal direction of said plurality of line sources or said linear focal points.

13. A scanning confocal microscope according to claim 12, wherein said scanning means scans only in a direction perpendicular to an array of said plurality of line sources or said linear focal points.

14. A scanning confocal microscope according to claim 2, wherein said multiple line source producing means includes light source means for producing one line source or a plurality of line sources or light equivalent thereto; beam splitting means for splitting a light beam from said light source means into a plurality of beams; and linear focal point producing means for producing a plurality of linear focal points from said plurality of beams split by said beam splitting means.

15. A scanning fluorescence microscope according to claim 3, wherein said specimen image producing means includes image forming means and an image memory, so that addresses representing locations on said specimen calculated from position coordinates on respective surfaces of said light-receiving elements and the amount of deflection caused by said scanning means are preset in said image memory, and values corresponding to signals from said light-receiving elements are written in said addresses by said image forming means to form an image of said specimen.

16. A scanning fluorescence microscope according to claim 3, wherein said plurality of focal points are arranged at intersections formed by two sets of equally spaced parallel lines mutually making a predetermined angle, and said scanning means scans each of small regions of parallelograms into which said plurality of focal points are divided.

17. A scanning fluorescence microscope according to claim 16, wherein said predetermined angle is a right angle and each of said small regions is shaped into a rectangular or square form.

18. A scanning fluorescence microscope according to claim 3, wherein said plurality of focal points are arranged at equal intervals along equally spaced parallel lines making a minute angle with a scanning direction of said scanning means, said scanning means scanning in only one direction.

19. A scanning fluorescence microscope according to claim 18, wherein said minute angle is set so that when said plurality of focal points are scanned by said scanning means, adjacent scanning paths come in contact with each other or partly overlap.

20. A scanning fluorescence microscope according to claim 4, wherein said specimen image producing means includes image forming means and an image memory, so that addresses representing locations on said specimen calculated from position coordinates on respective surfaces of said light-receiving elements and the amount of deflection caused by said scanning means are preset in said image memory, and values corresponding to signals from said light-receiving elements are written in said addresses by said image forming means to form an image of said specimen.

21. A scanning fluorescence microscope according to claim 4, wherein said plurality of linear focal points are arranged to be parallel with, and equidistant from, one another and said scanning means scans only in a direction making a predetermined angle with a longitudinal direction of said plurality of linear focal points.

22. A scanning fluorescence microscope according to claim 21, wherein said scanning means scans only in a direction perpendicular to an array of said plurality of linear focal points.

23. A scanning confocal microscope comprising:

light source means for producing one point source or a plurality of point sources or light equivalent thereto;

beam splitting means for splitting a light beam from said light source means into a plurality of beams; and multiple focal point producing means for producing a plurality of focal points from said plurality of beams split by said beam splitting means, said scanning confocal microscope further comprising split-beam control means for controlling the number of beams split by said beam splitting means.

* * * * *